United States Patent [19]

Philipp et al.

[11] Patent Number: 4,530,649

[45] Date of Patent: Jul. 23, 1985

[54] APPARATUS FOR FEEDING OF MOLTEN STRANDS TO A DRAINAGE TROUGH

[75] Inventors: Heinrich Philipp, Aschaffenburg; Horst H. Lettner, Glattbach; Friedrich Hunke, Grossostheim, all of Fed. Rep. of Germany

[73] Assignee: AUTOMATIK Apparate-Machinenbau H. Hench GmbH, Grossostheim, Fed. Rep. of Germany

[21] Appl. No.: 442,148

[22] Filed: Nov. 16, 1982

[30] Foreign Application Priority Data

Nov. 17, 1981 [DE] Fed. Rep. of Germany ....... 3145613

[51] Int. Cl.³ .............................. B29F 3/08; B29F 3/01
[52] U.S. Cl. ...................................... 425/71; 425/215; 425/378 S
[58] Field of Search ............ 425/379 S, 378 S, 378 R, 425/377, 382.2, 215, 308, 68, 70, 71, 86, 216, 217, 310, 315, 188, 190, 311, 67, 71, 69; 264/39, 143, 142; 193/16, 21, 35, 22, 23

[56] References Cited

U.S. PATENT DOCUMENTS

| | | | |
|---|---|---|---|
| 2,539,916 | 1/1951 | Ludington et al. | 264/142 |
| 2,758,421 | 8/1956 | Smith | 193/16 |
| 3,121,132 | 2/1964 | DelBene | 264/143 |
| 3,323,887 | 6/1967 | Downey | 425/71 |
| 3,326,309 | 6/1967 | Swearengen | 193/2 R |
| 3,650,645 | 3/1972 | Yamada et al. | 425/71 |
| 3,850,556 | 11/1974 | Young | 425/308 |
| 4,025,252 | 5/1977 | Hunke | 425/71 |
| 4,180,539 | 12/1979 | Clarke | 264/143 |

*Primary Examiner*—Willard E. Hoag
*Attorney, Agent, or Firm*—George E. Kersey

[57] ABSTRACT

Extrusion apparatus for extruding plastic filaments and having a trough for cooling filaments, the trough being pivoted about a horizontal pivot means such that the upper end of the trough can pass from the collecting position through the fall line of the filaments to a position where the filaments fall behind the trough.

16 Claims, 12 Drawing Figures

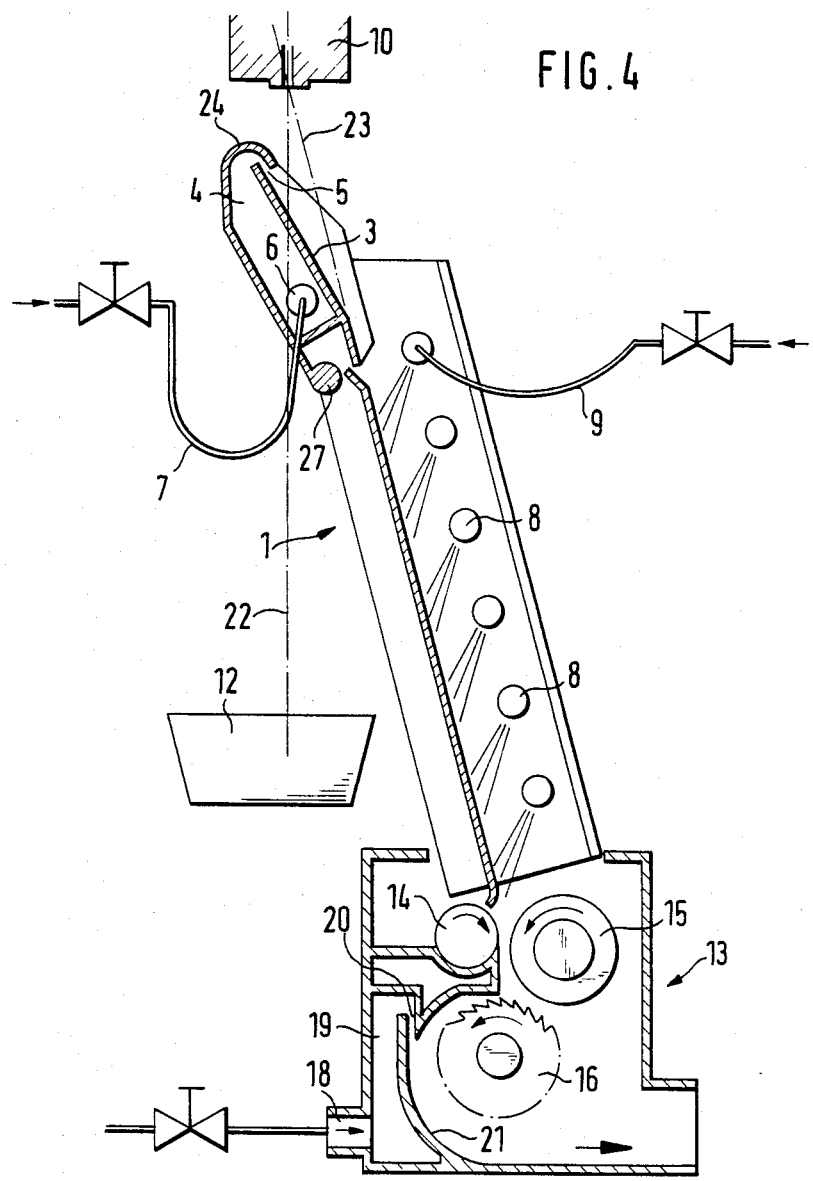

APPARATUS FOR FEEDING OF MOLTEN STRANDS TO A DRAINAGE TROUGH

BACKGROUND OF THE INVENTION

This invention relates to the feeding of molten strands of plastic to a trough where the strands are solidified, and more particularly to a slanted drainage trough which extends under the fall line of stands that emerge from nozzles.

In the use of troughs to collect molten plastic strands, the trough is pivoted into position to receive the strands and is supplied with a coolant, such as water, which is directed to the upper end of the trough and drains along its slanted face.

A representative drainage trough for molten plastic strands is disclosed in German patent No. 2,503,455. The drainage trough of this patent is used with a pivotal flap. The flap is mounted on a perpendicular axle with respect to the trough at its upper end. The flap can be pivoted to occupy one of two positions. In the operating position the flap is pivoted into contact with the drainage trough to catch the strands emerging from the nozzles and conduct them to the coolant water that is applied to the product for solidification of the strands. In the non-operating position, the flap is pivoted away from the trough so that the strands emerging from the nozzles fall between the flap and the trough. During initial operation it is necessary to deflect the material emerging from the nozzles in order to avoid the contamination associated with the initial flow, as well as to allow the composition which is emerging from the nozzles to reach a uniform state. In the deflection of the strands from the trough, they are conducted through a relatively narrow shaft formed between the flap and the reverse side of the trough. Since the initial flow of the contaminated and non-uniform material is through the drainage shaft, it is necessary to clean the shaft from time to time. However, because of the construction of the flap relative to the trough in forming the shaft, cleaning is difficult because the interior of the shaft is relatively inaccessible.

Accordingly, it is an object of the invention to facilitate the feed and cooling of molten strands of plastic. A related object is to avoid the feed of contaminated and non-uniform plastic material to a drainage trough where molten stands are subjected to cooling.

Another object of the invention is to achieve the feed of relatively uniform stands of plastic material to a drainage trough for cooling without requiring the periodic cleaning and removal of contaminated and non-uniform materials that flow during initial operation of the cooling trough.

Still another object of the invention is to avoid the need for pivotal flaps in the operation of cooling troughs and the associated inaccessibility from the standpoint of cleaning and maintenance that is occasioned by the presence of such a flap.

SUMMARY OF THE INVENTION

In accomplishing the foregoing and related objects, the invention provides a drainage trough which is readily accessible to the user in all of its operating positions and substantially eliminates the risk of contamination from the initial flow of plastics material.

In accordance with one aspect of the invention, a drainage trough is provided with an axis of pivot that is displaced from the upper end of the trough and generally lies perpendicular to it. The collection portion of the trough, which is disposed above the axis of pivot, can be moved from its operating position during which the strands are collected to a non-operating position which permits the stands to fall freely behind the entire trough and thus avoid any contamination of the trough by the falling material.

As a consequence of the pivotal arrangement provided by the invention, the back side of the trough is freely accessible, both in the operating position where the strands are being collected on the trough as well as in the non-operating position where no collection takes place. Since the strands fall freely behind the pivotable section, there is no tendency for the material of the strands to adhere to the trough, and the risk of contamination is eliminated. Because of the free accessibility to the back side of the trough any incidental contamination, which would not be generally objectionable in any event, is readily eliminated. The invention also avoids the kind of contamination that can occur when a diverting flap is used since there is contact of the flow with the forward side of the flap during the collection of strands and their conduction to a drainage trough in the operating position.

In accordance with another aspect of the invention, the axis of pivot for the drainage trough can be located at various positions. When the drainage trough is relatively short, the axis is suitable disposed at the lower end, and the entire trough is pivotable. Conversely, when the drainage trough is relatively long, the axis of pivot can be disposed at a approximately the center of the trough or in its upper third. In this case, only the portion of the trough that is above the axis of pivot will become pivoted.

In accordance with a further aspect of the invention, the degree of pivoting is governed by the desired accessibility to the nozzles that supply the molten strands of material. The further that the trough, or a specified part, is pivoted, the greater is the accessibility to the nozzles.

In accordance with yet another aspect of the invention, the pivoting of the drainage trough causes the collection portion to move through the strands from the nozzles, and a separational element can be included with the trough. The separational element provides for separation of the strands and movement of the collection portion takes place through the strands. During this movement the strands can be automatically conducted to the collection trough without any nozzle manipulation.

The separation element desirably takes the form of a rod disposed perpendicular to the strands at the end of the collection trough that moves through the strands, and displaced from them. When the end of the trough moves to the strands, they are first caught by the rod and thus kept away from the collection portion of the trough. The strands then fall away from the rod because of gravity and can easily fall from the rod behind the collection trough. The spacial separation of the rod from the upper end of the collection trough assures that the rod will not be significantly cooled and consequently allows the strands on the rod to remain in molten condition.

In accordance with a still further aspect of the invention, the separational element can take the form of a knife which sweeps past the nozzles during movement of the trough. In this case the strands are separated directly below the nozzles so that the subsequent flow of material from the nozzles falls upon the collection part of the trough when it is pivoted into operating position. The collected strands are then subjected to the desired cooling.

DESCRIPTION OF THE DRAWINGS

Other aspects of the invention will become apparent after considering several illustrative embodiments taken in conjunction with the drawings in which:

FIG. 4 is a schematic view of a further embodiment of the invention with the axis of pivot in the upper third of the drainage trough;

DETAILED DESCRIPTION

Figure 1:
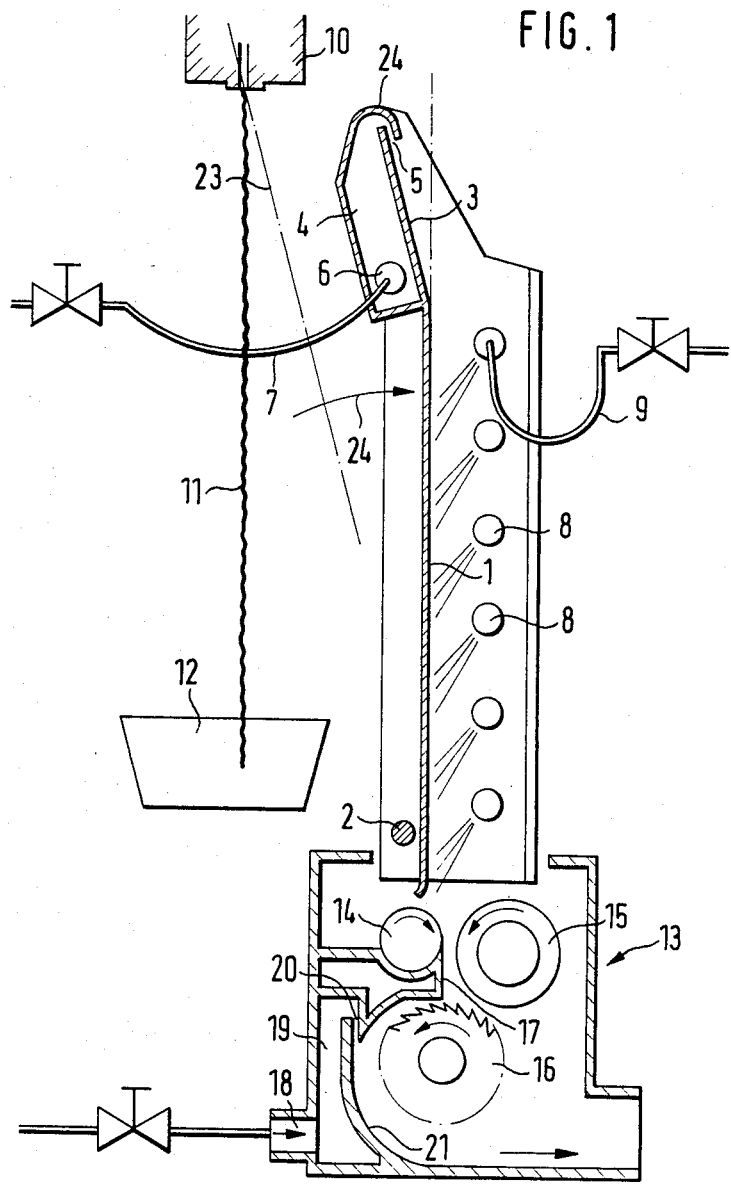
FIG. 1 is a schematic view of a drainage trough in accordance with the invention with an axis of pivot disposed at the lower end of the trough.

With reference to the drawings, the device shown in FIG. 1 contains a drainage trough 1 at whose lower end there is disposed an axle 2, about which the drainage trough 1 can be pivoted. At its upper end the drainage trough 1 contains the collection part 3, which consists of a water box 4 with a water overflow 5. Cooling water is applied to the water box 4 through a collection element 6 into a feed line 7. Furthermore, several spray nozzles 8 are disposed in front of the drainage trough 1. Cooling water is applied to the spray nozzles 8 through a feed line 9. The spray nozzles 8 are directed towards the drainage trough 1 which is sprayed with cooling water.

FIG. 1 shows the non-operating position of the drainage trough 1. In this position the nozzle arrangement 10 is situated above and laterally with respect to the drainage trough 1. The plastic strands in their molten condition emerge from said nozzle arrangement 10. In the non-operating position a plastic strand 11 flows vertically downward and is collected by the container 12.

The granulator 13 is disposed below the drainage trough 1. The granulator 13 consists of the two pull-in rollers 14 and 15 and the milling unit 16, which interacts with the cutter knife 17. Cooling water is applied to the granulator 13 through a connection 18. The cooling water rises in the cooling water space 19. It is conducted through the nozzle 20 to the floow 21 which runs around the milling unit 16. Here the cooling water which has been fed in this fashion encounters the granules which have been cut by the milling unit 16. The granules are then flushed out of the granulator 13 in the direction of the arrow.

Figure 2:
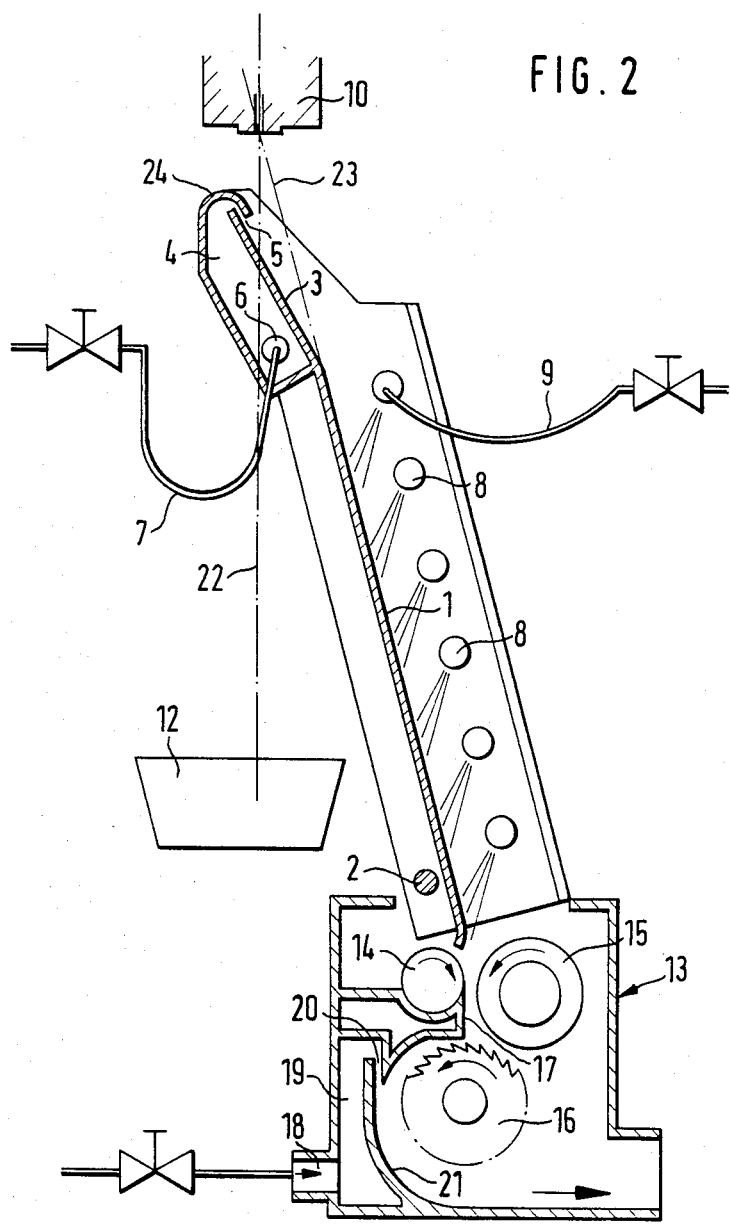
FIG. 2 is a schematic view of the trough of FIG. 1 in its operating position.

FIG. 2 shows the same device in its operating position. As can be seen in this position the strands emerging from the nozzle arrangement 10 fall vertically downward in the direction of the line 22 until they are collected in the collection portion 3 and are conducted to a drainage trough 1. The strands then enter the region of the pull-in rollers 14 and 15 and are cut into granules by the milling unit 16. As a result of appropriate speed of the rollers 14 and 15, the strands are pulled tight over the drainage trough 1 and occupy the position shown by line 23.

The process described above, in as much as it describes the cooling and granulating of the strands, is known from German patent No. 2,503,455.

In the non-operating position shown in FIG. 1 the strands 11 fall unended from the drainage trough, 1 and in the collection portion 3, which is a component of the drainage trough 1, vertically into the container 12. This operating phase is used when the device is being started up. In this phase plastic material emerges from the nozzle arrangement 10. Frequently, this plastic material does not yet have the required quality. Such material may not be mixed with granules consisting of full-value material. As can be seen, the region below the nozzle arrangement 10 is freely accessible. There is no risk of contaminating the drainage trough 1. Now, if full-value material emerges from the nozzle arrangement 10, the drainage trough 1, with its collection portion 3, is pivoted about the axle 2 counter the arrow 24 which is shown in FIG. 1. In this operating position the strands emerging from the nozzle arrangement 10 are collected in the collection portion 3. The strands are then processed to granules in well known fashion.

The drainage together with its collection part 3 moves in both directions through the strands 11 or 23 respectively, so that the drainage flow is not interrupted. To prevent the liquid melted strands from adhering at the upper end 24 of the collection part 3 during this pivoting process, the flow of strands is briefly interrupted in well known fashion through the valve (not shown) of the nozzle arrangement 10.

As can be seen the drainage of plastic material of inadequate quality is very simple. This happens by collecting the plastic material aft the drainage trough 1 with its collection part 3, and specifically on the back side of the drainage trough 1, so that the removed plastic materials, that is the strands which are designated 11 in FIG. 1, may be readily observed. If is ascertained that a lot of good quality material is emerging from the nozzle arrangement 10 the drainage trough 1 with its collection part 3 is pivoted into the path of the strands 1 as explained above. For this purpose, the flow of plastic material is briefly stopped. When the plastic material again emerges from the nozzle arrangement 10 the respective strands 23 will encounter the collection part 3 which lies below the nozzle arrangement 10. As the strands above, the strands 23 are conducted from there to the drainage trough 1 and the granulator 13.

Figure 3:
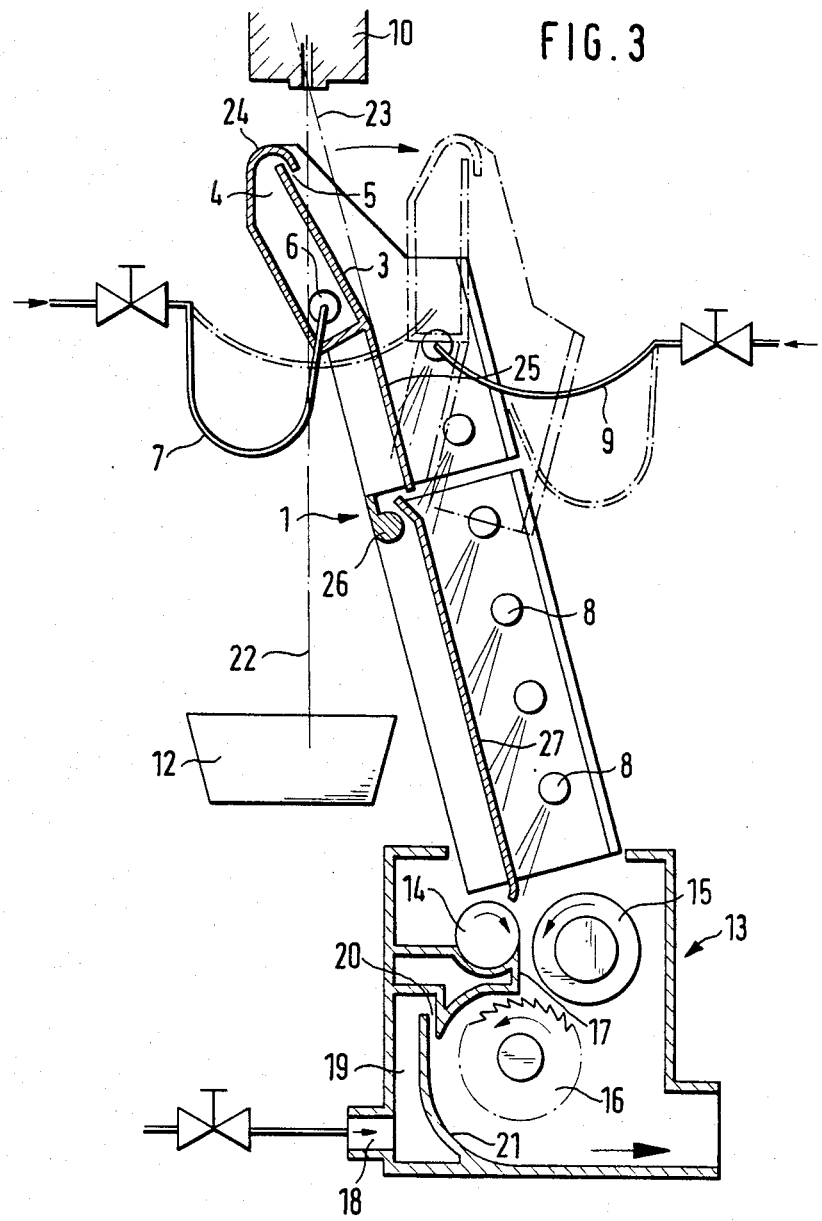
FIG. 3 is a schematic view of an alternative embodiment of the invention with an axis of pivot near the middle of the trough and illustrating the non-operating position of the trough in phantom.

The device shown in FIG. 3 involves a modification of the device according to FIGS. 1 and 2. In the device of FIG. 3, only a portion of the drainage trough 1 is pivoted, leaving its upper region 25 with the collection part 3. To pivot the region 25 with the collection part 3 the pivoting axle 26 has been provided, which is situated in the center of the drainage trough 1, which here consists of a lower region 27 and an upper region 25 with the collection part 3.

In FIG. 3 the non-operating position of the upper region 25 is shown with dots and dashes, so that FIG. 3 shows both the operating and non-operating position. With regard to further functioning of the device, reference is made to above discussion in connection with FIGS. 1 and 2.

FIG. 4 shows another variant of the device according to FIGS. 1 through 3. In this variant, the pivoting axle of the pivotable part of the drainage trough 1 lies still higher than in the device of FIG. 3. This is the pivoting axle 27, above which is disposed the collection part 3, which is the only pivotable part in this case. The collection part 3 can here be pivoted (not shown) in a similar position as shown in the dash-dot lines of FIG. 3. Furthermore reference is made to the explanations for FIGS. 1 through 3.

The device shown in FIGS. 5A through 5D involve a similar device as is shown in FIG. 4. However, in FIGS. 5A through 5D only that portion of the device that is of interest is shown, mainly the pivotable collection part 3. The collection part 3 is equipped with a rod 28, which acts as a separation element and which runs perpendicular to the strands 11 or 29 respectively. It here runs parallel to the row of nozzles in the nozzle arrangement 10. The rod 28 is disposed at a distance from the end 24 of the collection part 3 where this end passes through the strands. Thus, it cannot be cooled by the cooling water that is conducted through the water box 4. Because of the rod 28, which acts as a separation element, the collection part 3 can be pivoted without interrupting the flow of plastic material from the nozzle arrangement 10.

Figure 5D:
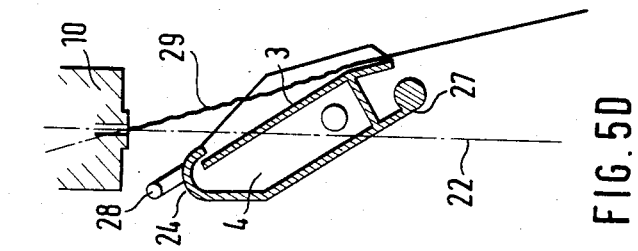
FIGS. 5A through 5D are partial schematic views showing a separation rod positioned at the upper end of the trough in various operating positions to control the flow of material from a nozzle to the trough.
Figure 5C:
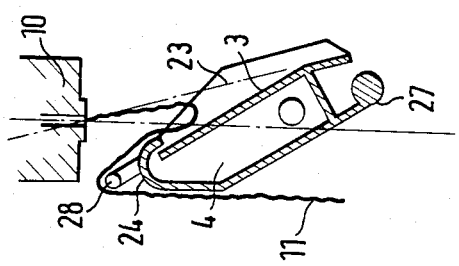
Figure 5B:
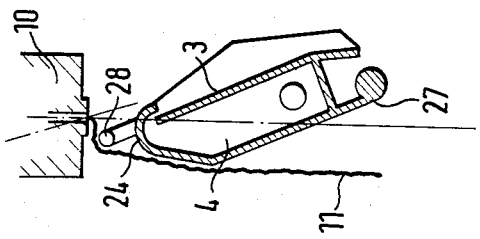
Figure 5A:
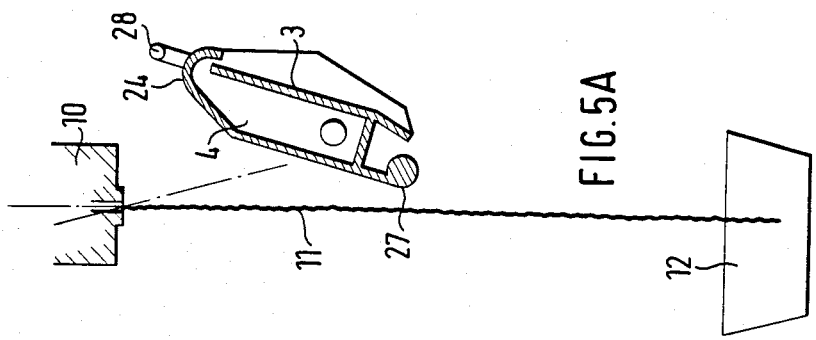

FIG. 5A shows the non-operating position of the device, in which the collection part 3 is pivoted away from the strands 11. The strands 11 are of inadequate quality and are intercepted by the container 12.

When the material is of perfect quality, the collection part 3 is pivoted through the strands 11 and specifically into the position shown in FIG. 5B. Here the strands emerging from the nozzle arrangement 10 will first hand up on the rod 28 and fall down on both sides of the rod 28 as shown in FIG. 5C. Since the rod 28 is not cooled, the strands which first adhere to the rod 28 remain in the molten condition and finally tear off under the action of gravity. From this results the operating state shown in FIG. 5D in which the strand material 29 continues to flow from the nozzle arrange 10 and is collected by the collection part 3 and is conducted to the portion of the collection trough (not shown here) which is shown in FIG. 4.

This arrangement achieves the feature that the changeover that does the pivoting from the non-operating position shown in FIG. 5A into the operating position shown in FIGS. 5B through 5D can take place without interrupting the flow of the strands. Thus, the rod 28 which acts as a separation element takes care the changeover of the flow of strands proceeds automatically with the pivoting of the collection part.

In order to prevent even a slow solidification of residue strand material which may possibly adhere to the rod 28, the rod 28 is heated approximately to the melting point of the strand of material being processed, for example by an electrical heating mechanism.

Figure 6A:
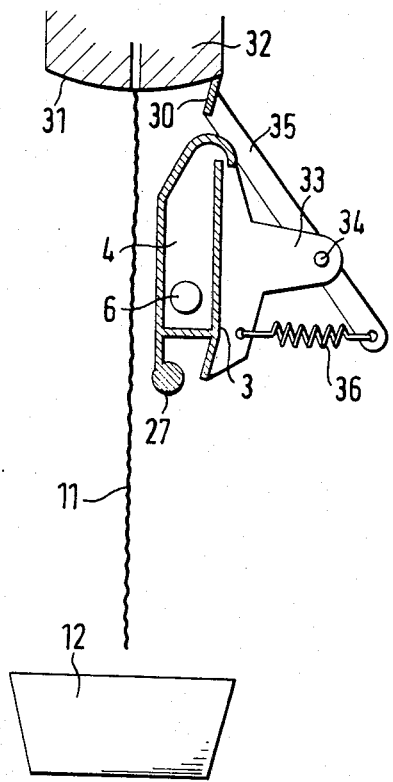
FIGS. 6A and 6B and 7A, B are fragmentary schematic views showing a separational element in the form of a knife in both non-operating and operating positions for the associated collection trough.
Figure 6B:
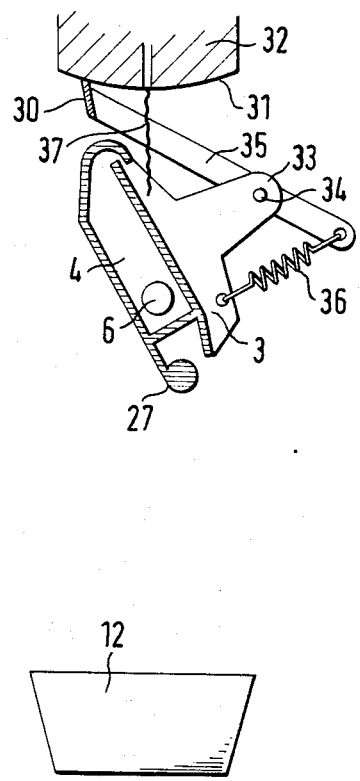

The device shown in FIGS. 6A and 6B is shown in similar fashion to the device of FIGS. 5A through 5D, that is, essentially limited to the collection part 3, so that reference can be made to the explanations concerning FIG. 4 as far as the further functioning of the device is concerned.

In the device of FIGS. 6A and 6B, the knife 30 is provided as a separation element. When the collection part 3 moves from the non-operating position of FIG. 6A into the operating position of FIG. 6B, the knife 30 passes over the surface 31 of the nozzle arrangement 22. To facilitate this process the surface 31 is designed with a slight concave curvature. The knife 30 is attached to the extension arm 33, and specifically over the axle 34, which supports the lever 35 at one of whose ends is fastened the knife 30.

A tension spring 36 is hung in at the other end of the lever 35, and this tension spring 36 is also fastened to the extension arm 33. Due to the action of the tension spring 36, the lever 35 tends to turn clockwise. However, because the knife 30 contacts the surface 31, the lever is prevented from executing this motion.

Starting from a non-operating position in FIG. 6A, one thus obtains the following function: In the non-operating position the strands 11 flow vertically from the nozzle arrangement 32 and are collected by the container 12. If the collection part 3 is now pivoted into the operating position of FIG. 6B the lever 35 and also the knife 30 are moved along the surface 31 of the nozzle arrangement 32, through the action of the extension arm 33. The knife 30 slides over the surface 31 and, in one stroke, passes over all the nozzles of the nozzle arrangement 32, which lie one behind the other. Here the knife 30 passes through the strands 11, so that the flow of strands is interrupted. During this interruption the collection part 3 moves in such a manner that the strands 37 which continue to flow after the interruption (see FIG. 6B) now encounter the collection part 3 which is in its operating position. The collection part 3 may further conduct the strands 37, in the manner described in FIG. 4, to the drainage trough which is situated below, and to the granulator 13.

It should also be pointed out that the knife 30 is supported by arm 35 at each of its two ends so that the free space exists between the arms (in FIG. 6B only the forward arm is visible). The strands 37 can flow down through this free space. The strands are therefore not impeded in their flow by the arms 35.

Figure 7A:
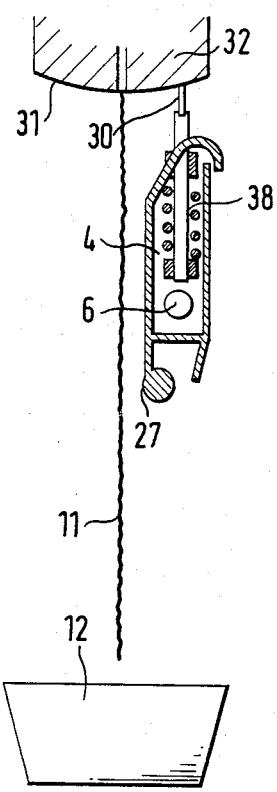
Figure 7B:
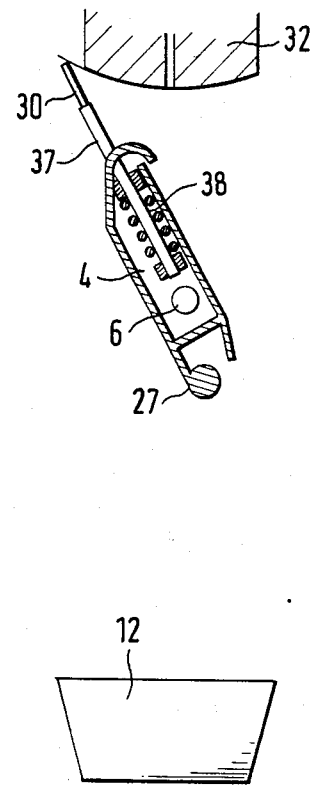

While various aspects of the invention have been set forth by the drawings and specification, it is to be understood that the foregoing detailed description is for illustration only and that various changes in parts as well as the substitution of equivalent constituents for those shown and described may be made without departing from the spirit and scope of the invention as set forth in the appended claims. In FIGS. 7a and b ab apparatus is shown which corresponds to the apparatus according to FIGS. 6a and b in which however lever 35 is replaced by the telescope 38 being under spring tention.

What is claimed is:

1. Extrusion apparatus having a drainage trough for controlling the feed of at least one molten strand of material emerging from at least one nozzle, said trough being movable between an operating position for collecting the strand on the trough in a line of fall from said nozzle and a non-operating position for bypassing the trough by the strand said trough having a horizontal pivot means displaced from an upper end of the trough and being pivotable about said pivot means from the operating position where the strand can be collected on the trough, such that said upper end passes through the line of fall of the strand, to a non-operating position where the strand can fall freely behind the trough without contacting the trough, and a collection part of said trough being coupled with an element which separates a plurality of strands during movement of said collection part and means for supplying cooling fluid to cool said strands.

2. Apparatus in accordance with claim 1 characterized in that the separation element is rod which is disposed at an angle to said strands at the end of said collection part and moves through said strands at a prescribed distance therefrom, said rod diverting said strands from said collection part during the motion thereof to said non-operating position.

3. Apparatus in accordance with claim 1 characterized in that said separation element is a knife which passes over the nozzles feeding said strands.

4. Extrusion apparatus having a nozzle and a drainage trough for cooling strands emerging from said nozzle, said trough having an operating position for collecting the strands in the trough in a line of fall from said nozzle and a non-operating position for by-passing the trough by the strand, said trough having a pivot means with a substantially horizontal axis of pivot spaced from an upper end of said trough, said trough being movable about said pivot means such that an upper end of said trough can pass from said operating position through said line of fall to the non-operating position in which the strand can fall freely behind the trough without contacting the trough.

5. Apparatus as defined in claim 4 characterized in that said axis of pivot is disposed at the lower end of said drainage trough.

6. Apparatus in accordance with claim 5 characterized in that a collection part of said trough is coupled with an element which separates a plurality of strands during movement of said collection part.

7. Apparatus in accordance with claim 6 characterized in that the separation element is a rod which is disposed at an angle to said strands at the end of said collection part and moves through said strands at a prescribed distance therefrom, said rod diverting said strands during the motion thereof to said non-operating position.

8. Apparatus in accordance with claim 6 characterized in that said separation element is a knife which passes over the nozzles feeding said strands.

9. Apparatus as defined in claim 4 characterized in that said axis of pivot is disposed at substantially the center of said drainage trough.

10. Apparatus in accordance with claim 9 characterized in that a collection part of said trough is coupled with an element which separates a plurality of strands during movement of said collection part.

11. Apparatus in accordance with claim 10 characterized in that the separation element is a rod which is disposed at an angle to said strands at the end of said collection part and moves through said strands at a prescribed distance therefrom, said rod diverting said strands during the motion; thereof to said non-operating position.

12. Apparatus in accordance with claim 10 characterized in that said separation element is a knife which passes over the nozzles feeding said strands.

13. Apparatus in accordance with claim 4 characterized in that said axis of pivot is disposed in the upper third region of said drainage trough.

14. Apparatus in accordance with claim 13 characterized in that a collection part of said trough is coupled with an element which separates a plurality of strands during movement of said collection part.

15. Apparatus in accordance with claim 14 characterized in that the separation element is a rod which is disposed at an angle to said strands at the end of said collection part and moves through said strands at a prescribed distance therefrom, said rod diverting said strands during the motion thereof to said non-operating position.

16. Apparatus in accordance with claim 14 characterized in that said separation element is a knife which passes over the nozzles feeding said strands.

* * * * *